United States Patent [19]

Buchanan

[11] Patent Number: 5,150,538
[45] Date of Patent: Sep. 29, 1992

[54] SUBMERGING FISHING LURE

[75] Inventor: William R. Buchanan, Long Beach, Calif.

[73] Assignee: Sevenstrand Tackle Corporation, Long Beach, Calif.

[21] Appl. No.: 660,128

[22] Filed: Feb. 25, 1991

[51] Int. Cl.⁵ .............................................. A01K 85/00
[52] U.S. Cl. .................. 43/42.28; 43/42.39; 43/42.45
[58] Field of Search .............. 43/42.39, 42.28, 42.45, 43/44.96, 42.47, 42.36, 42.03

[56] References Cited

U.S. PATENT DOCUMENTS

| | | | |
|---|---|---|---|
| 1,872,406 | 8/1932 | Chapleau | 43/42.47 |
| 2,503,620 | 4/1950 | Larson | 43/42.47 |
| 2,876,580 | 3/1959 | Schwartztrauber | 43/42.31 |
| 3,229,562 | 1/1967 | Bennecke | 43/42.39 |
| 3,757,451 | 7/1973 | Cottle | 43/42.28 |
| 3,798,822 | 3/1974 | Lampus | 43/42.36 |
| 4,625,447 | 12/1986 | Buchanan . | |
| 4,662,100 | 5/1987 | Yarusso | 43/42.45 |
| 4,751,789 | 6/1988 | Devereaux | 43/42.39 |
| 4,920,688 | 5/1990 | Devereaux | 43/42.39 |

Primary Examiner—Richard K. Seidel
Assistant Examiner—James Miner
Attorney, Agent, or Firm—William W. Haefliger

[57] ABSTRACT

A fishing lure, the combination comprising a lure head and a lure tail spaced apart longitudinally, the tail being longitudinally elongated; the head having a front edge, and two laterally spaced, elongated edges tapering rearwardly and toward the tail, the head having opposed faces with spacing therebetween substantially less than the length dimension of each the elongated edges, the head having weight substantially greater than the weight of the lure tail; and there being means to connect a fishing line to the fishing lure so that the line approaches a mid-portion of one of the head faces.

13 Claims, 2 Drawing Sheets

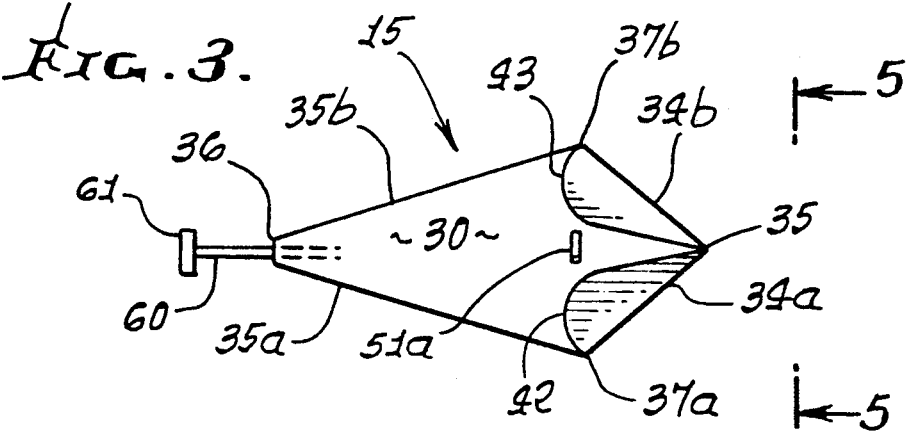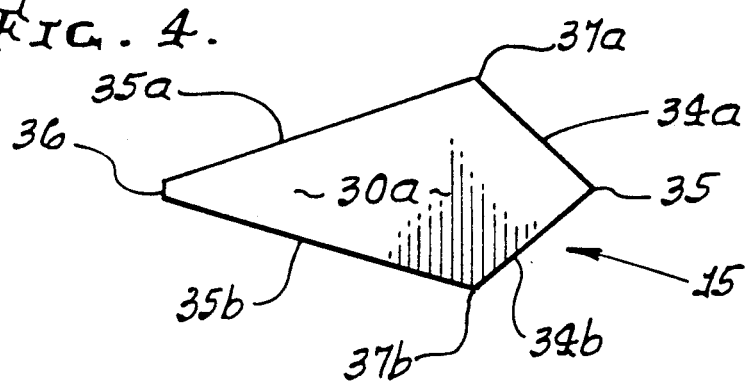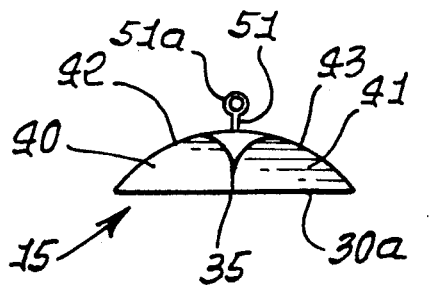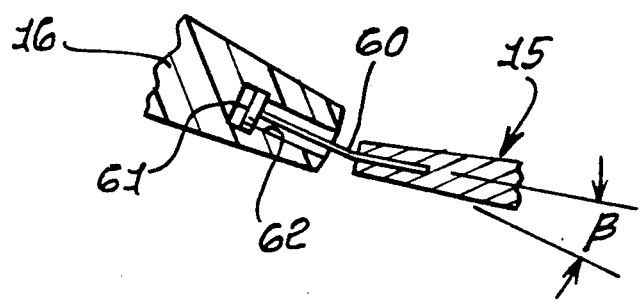

SUBMERGING FISHING LURE

BACKGROUND OF THE INVENTION

This invention relates generally to fishing lures, and more particularly, to a lure which tends to move downwardly in a water body, such as the ocean, as during trolling, and in response to increased forward speed of the lure in the water.

Prior lures have tended to rise in the water, as forward speed of the fishing boat increases. In many cases, this is undesirable, since the fish may be located at lower depth, whereas it is desired to increase boat speed. There is need for lures which embody the improved construction, modes of operation, and control results of the lure of the present invention.

SUMMARY OF THE INVENTION

It is a major object of the invention to provide an improved lure meeting the above needs. Basically, the lure comprises:

a) a lure head and a lure tail spaced apart longitudinally, the tail being longitudinally elongated, b) the head having a front edge, and two laterally spaced, elongated edges tapering rearwardly and toward the tail, the head having opposed faces with spacing therebetween substantially less than the length dimension of each the elongated edges, the head having weight substantially greater than the weight of the lure tail, c) and there being means to connect a fishing line to the fishing lure so that the line approaches a mid-portion of one of the head faces.

As will be seen, the head may be metallic and have two laterally spaced forward portions flaring rearwardly toward the rearwardly tapering edges, respectively. The laterally spaced rearwardly tapering edges may have about the same length, each being longer than the lateral dimension of each forward portion.

It is another object of the invention to shape the head so that one of its opposed faces is generally dome shaped, and the other face is substantially flat, helping to establish the desired control of lure vertical movement in response to changes in forward speed in the water body. As will be seen, the opposed faces typically may taper toward one another proximate the front edge.

It is another object to connect the head to the tail to allow rotary movement of the head, relative to the tail; and in this regard, the elongated tail may consist of foamed plastic material. Fish hook means is carried by the tail, and may be disguised by plastic strands, as will be seen.

As a consequence of such construction, the line is effectively connected to the head generally beneath the head as the head is pulled forwardly in the ocean during trolling, the head inclined forwardly and upwardly. In this regard, the tail extends stiffly, rearwardly and downwardly from the head whereby water flowby force tends to lift the tail and lower the head, during trolling.

These and other objects and advantages of the invention, as well as the details of an illustrative embodiment, will be more fully understood from the following specification and drawings, in which:

DRAWING DESCRIPTION

FIG. 3 is a top plan view of the lure head employed in FIGS. 1 and 2;

FIG. 4 is a bottom plan view of the FIG. 3 head;

FIG. 5 is an elevation taken on lines 5—5 of FIG. 3; and

FIG. 6 is a section showing a rotatable connection between the lure head and tail.

DETAILED DESCRIPTION

Figure 1:
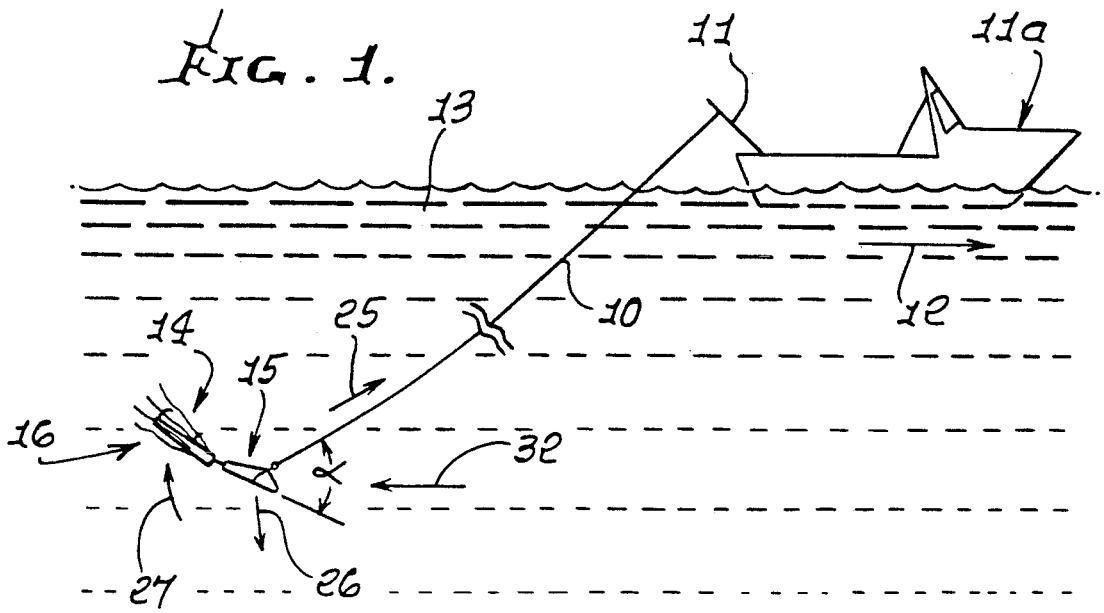
FIG. 1 is an elevation showing use of the present invention.
Figure 2:
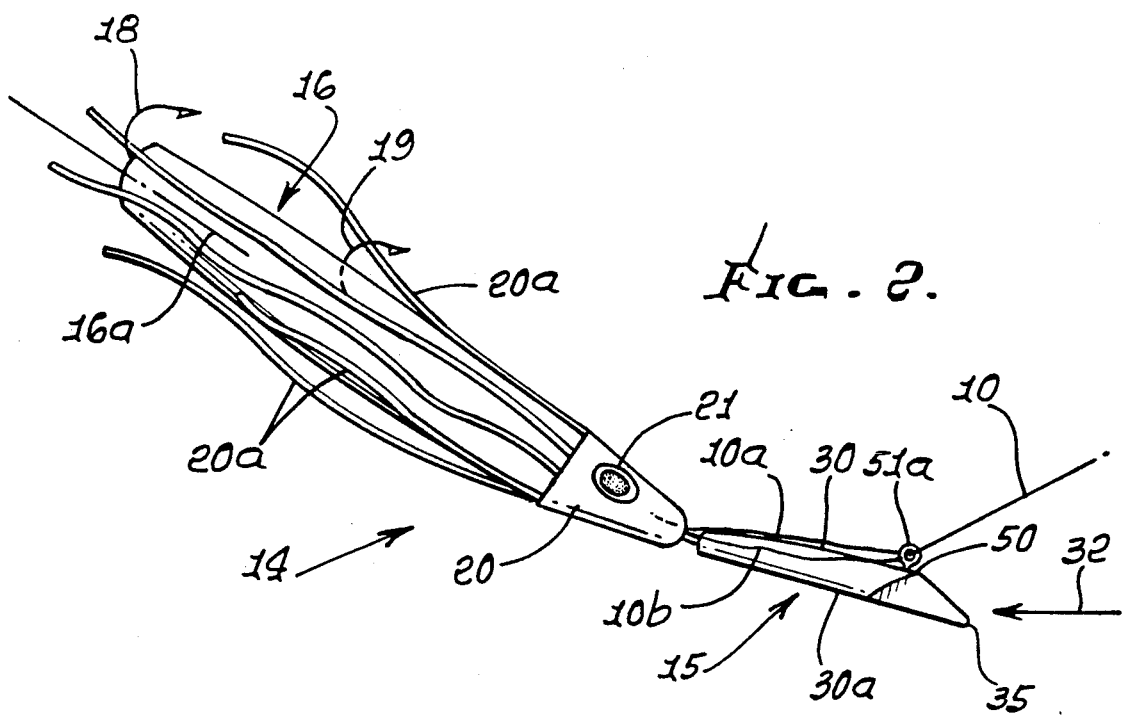
FIG. 2 is a side elevation showing a fishing line incorporating the invention.

In FIG. 1, a fishing line 10 extends from a fishing rod 11 on a boat 11a moving in the direction of arrow 12, on the ocean 13. Connected to the line is a lure 14, shown as having a head 15 and a tail 16, spaced apart longitudinally. The tail is longitudinally elongated and defines an axis 16a. It may consist of foam plastic material molded into generally tubular shape. It has length substantially greater than the overall length of the head, in the example. Fish hook means carried by the tail may include the two hooks 18 and 19, projecting as shown, and generally masked by the plastic strands 20a extending rearwardly from a plastic sheath 20 at the forward end of the tail. That sheath tapers forwardly and carries artificial fish eyes 21.

The lure is weighted by the head 15 consisting, for example, of metal. Examples are mixtures of lead and zinc. The head is so shaped that it provides a means whereby the faster the boat 11a travels relative to the ocean 13, the more the lure tends to dive or plunge in the ocean. Note in FIG. 1 the upward force exerted on the head in the direction 25, by line 10, and the downward force exerted in direction 26 by the lure weight. Force is also exerted in the direction 27 on the lure tail, by ocean water through which the lure passes.

The construction of the head surface or face 30, to which line 10 extends, is such that the forces on that face exerted by the relatively moving ocean water (see arrows 31) cause the head to plunge downwardly to greater extent the faster the boat travels on the ocean surface. In this regard, the face 30 acts like a kite surface, presented to wind.

For these purposes, and in the example, the head 15 has a front edge, including edge portions 34a and 34b that flare rearwardly from an apex 35, and two laterally spaced elongated edges 35a and 35b tapering rearwardly toward the tail, to intersect the rearwardmost end surface 36 of the head. Edges 34a and 35a intersect at 37a; and edges 34b and 35b intersect at 37b. Thus, a diamond-shaped head body is formed. Edges 35a and 35b are each longer than the lateral dimension of each front edge portion 34a and 35a.

The face 30 is generally shallow dome-shaped, whereas opposite face 30a is flat, the maximum thickness of the head between those faces being substantially less than the length of each edge 34a, 34b, 35a, and 35b.

It will also be noted that the head is generally dome shaped at the side of face 30; and that it forms two bevels 40 and 41 that extend rearwardly and upwardly from front edge portions 34a and 34b. Those bevels intersect the domed rearward extent of surface 30 along curved lines 42 and 43. Force arrow 32 in FIG. 1 is shown directed at the bevels.

The fishing line 10 extends at angle α relative to horizontal, and toward the top 50 of the domed surface 30. The eye 51a of a screw 51 passes the line, which then extends at 10a back into the nose of the tail. The line extension then connects to the tail and passes back at 10b to the eye 51a to which it is connected.

The head is joined rigidly to a rod 60 extending at angle β relative to the plane of face 30a. See FIG. 6. The rearward end of rod 60 has a bearing 61 attached thereto, and that bearing is rotatable in a bore 62 in the tail. Thus, the head is rotatable relative to the tail, about the axis of rod 60, which is coaxial with the axis of the tail. Accordingly, the head extends at angle β relative to the tail, where β is between 10° and 30°.

From the foregoing, it will be understood that a unique lure is provided which does not tend to rise in the ocean when the fishing boat increases its speed, but rather tends to sink, and vice versa (the lure tends to rise as the boat slows, aiding its retrieval).

I claim:

1. In a fishing lure, the combination comprising
   a) a lure head and a lure tail spaced apart longitudinally, the tail being longitudinally elongated and including plastic strands,
   b) the head having a front edge, and two laterally spaced, elongated edges tapering rearwardly and toward the tail, the head having opposed faces with spacing therebetween substantially less than the length dimension of each of said elongated edges, the head having weight substantially greater than the weight of said lure tail, one of said opposed faces being generally dome shaped and having a crest and two forward bevels, the other of said opposed faces being substantially flat,
   c) and there being means to connect a fishing line to the dome shaped face at said crest,
   d) the tail having a substantially stiff portion extending rearwardly from a rotary connection to the head,
   e) said bevels terminating rearwardly along two rearwardly convex lines that extend at opposite sides of said crest, said bevels also intersecting said substantially flat face.

2. The combination of claim 1 wherein the head front edge has two laterally spaced portions flaring rearwardly toward said rearwardly tapering edges, respectively.

3. The combination of claim 1 wherein said head is metallic.

4. The combination of claim 3 wherein the head metal consists essentially of a mixture of lead and zinc.

5. The combination of claim 4 wherein said laterally spaced rearwardly tapering edges have about the same length.

6. The combination of claim 1 wherein said faces taper toward one another proximate said front edge.

7. The combination of claim 1 wherein said two bevels extend rearwardly from said.

8. The combination of claim 1 including a fishing line effectively connected to said head generally above the head as the head is pulled forwardly in the ocean during trolling, the head inclined forwardly and upwardly.

9. The combination of claim 8 wherein the tail extends stiffly, rearwardly from the head at an angle whereby water flowby force tends to lift the tail and lower the head, during said trolling.

10. The combination of claim 1 wherein said tail comprises foamed plastic material, and has length substantially greater than the overall longitudinal length of said head.

11. The combination of claim 10 wherein the head defines a rearward apex, and the tail has a forward extent movably connected to the head proximate said apex.

12. The combination of claim 10 including fishhook means carried by the tail.

13. In a fishing lure, the combination comprising
   a) a lure head and a lure tail spaced apart longitudinally, the tail being longitudinally elongated and including plastic strands,
   b) the head having a front edge, and two laterally spaced, elongated edges tapering rearwardly and toward the tail, the head having opposed faces with spacing therebetween substantially less than the length dimension of each of said elongated edges, the head having weight substantially greater than the weight of said lure tail, one of said opposed faces being generally dome shaped and having a crest and two forward bevels, the other of said opposed faces being substantially flat,
   c) and there being means to connect a fishing line to the dome shaped face at said crest,
   d) the tail having a substantially stiff portion and extending rearwardly from a rotary connection to the head, said rotary connection defining an axis of tail rotation that extends at a fixed angle of between 10° and 30° relative to a front-to-rear axis defined by the head.

* * * * *